W. MITCHELL.
COUPLING.
APPLICATION FILED APR. 26, 1916.
1,241,137.
Patented Sept. 25, 1917.
2 SHEETS—SHEET 1.
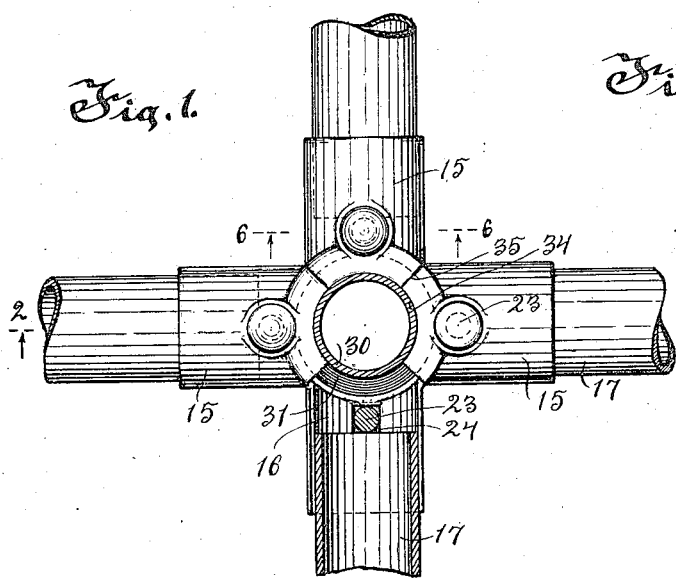
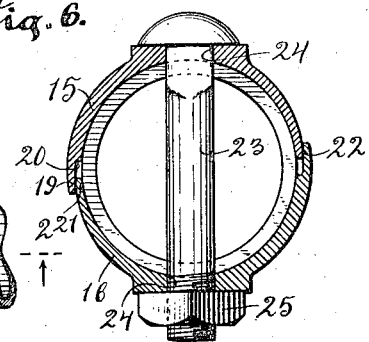
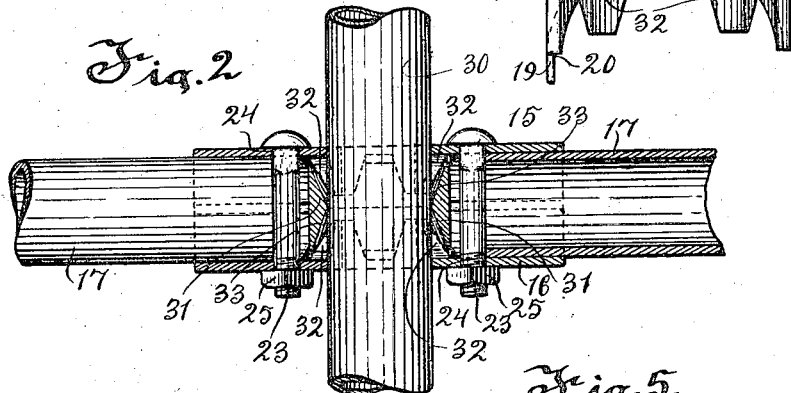
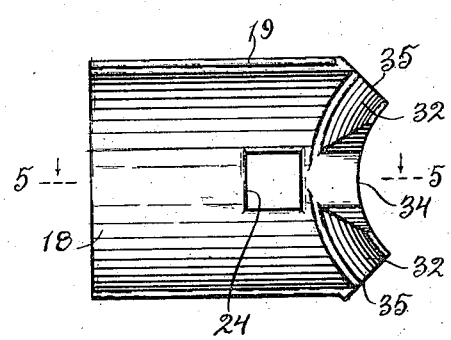
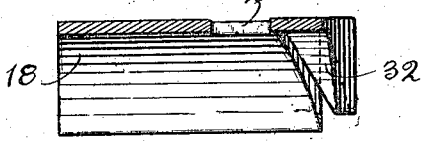
INVENTOR
William Mitchell
Morrell, Keeney & French
ATTORNEYS

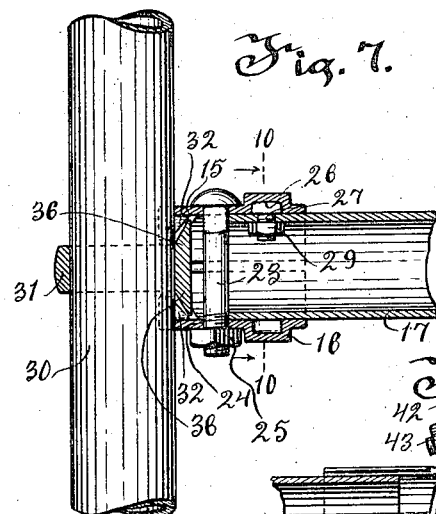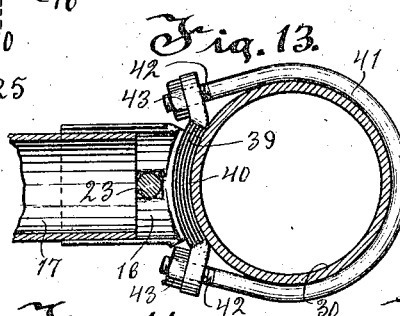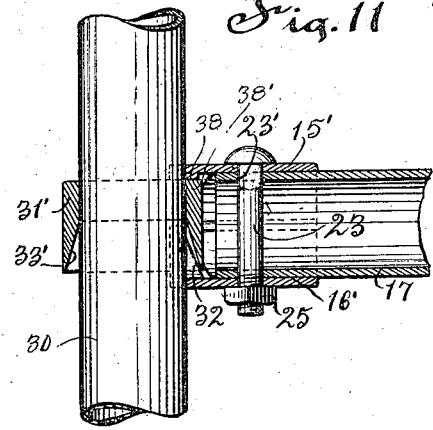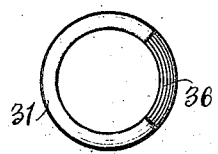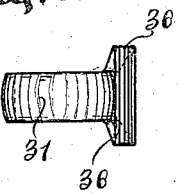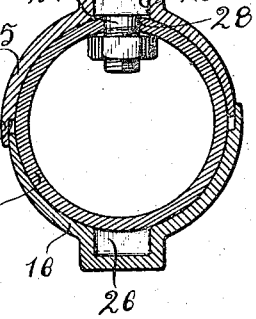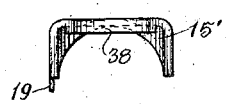

UNITED STATES PATENT OFFICE.

WILLIAM MITCHELL, OF MILWAUKEE, WISCONSIN.

COUPLING.

1,241,137. Specification of Letters Patent. Patented Sept. 25, 1917.

Application filed April 26, 1916. Serial No. 93,602.

*To all whom it may concern:*

Be it known that I, WILLIAM MITCHELL, a citizen of the United States, and resident of Milwaukee, in the county of Milwaukee and State of Wisconsin, have invented new and useful Improvements in Couplings, of which the following is a description, reference being had to the accompanying drawings, which are a part of this specification.

The invention relates to coupling devices.

The invention relates more particularly to that type of coupling for pipes and other members, whereby said members may be joined together without threading of the parts.

The invention is designed more particularly to provide a coupling consisting of plurality of clamping members embracing one of the parts to be coupled together and means for clamping said clamping members to the other of the parts to be connected.

The invention further designs to provide a coupling consisting of a plurality of clamping members embracing one of the parts to be coupled together and wedging means for connecting said clamping members to the other part to be coupled.

Devices of this kind find particular and useful application in connection with the construction of sanitary animal stalls and are so constructed as to prevent accumulation of dirt or other foreign matter upon or in the joints of the stall frame. In cattle stalls this sanitary feature is of great importance.

The invention further designs to provide a new and improved form of coupling device.

In the drawings:

Figure 1 is a view of the devices embodying the invention, parts being shown in section;

Fig. 2 is a section taken on the line 2—2 of Fig. 1;

Fig. 3 is a detail bottom view of one of the coupling members;

Fig. 4 is a detail end view of one of the coupling members;

Fig. 5 is a section taken on the line 5—5 of Fig. 3;

Fig. 6 is a section taken on line 6—6 of Fig. 1;

Fig. 7 is a modified form of device preferable where only one coupling device is used;

Fig. 8 is a detail plan view of the clamping ring shown in Fig. 7;

Fig. 9 is a detail side view of the clamping ring shown in Fig. 8;

Fig. 10 is a section taken on line 10—10 of Fig. 7;

Fig. 11 is another modified form of device;

Fig. 12 is an end view of the upper coupling members shown in Fig. 11; and,

Fig. 13 is another modified form of device, parts being removed and parts being shown in section.

In general, the device comprises a clamp for engaging one of the members to be coupled and means for connecting the clamp to the other member.

In Figs. 1 to 9 inclusive I have shown a clamp consisting of two similar mating members 15 and 16 and means for clamping them to one of the pipes 17. These members each comprise a semi-cylindrical portion 18, one of the edges of which is provided with a flange 19 and a recess 20 adjacent the flange so that when the members are assembled together the other edge 21 will fit within the recess 20 beneath the flange 19, as shown at 22 in Fig. 6. Thus the members when assembled embrace the end of the pipe 17 and their interfitting edges form a dust tight fit at the joints. It will be understood that the shape of the bodies may be other than cylindrical and that they may be formed to conform to the contour of the part or member to be held. The means for clamping the members 15 and 16 together and to the pipe 17 consists of a bolt 23, Figs. 1 to 7 inclusive, which passes through apertures 24 in said members and is provided with a nut 25 to secure the members together. In some instances to secure better clamping effect each of the members is provided with a recessed portion 26 for receiving the head of a short bolt 27 which bolt passes through a hole 28 near the end of the pipe 17 and is secured in position by a nut 29. This prevents any tendency of the members 15 and 16 to turn on the pipe when they are clamped together or the pipe pulling out or separating. The lower member is shown provided with a similar recess for the reason that the members are made interchangeable for convenience in manufacture and use. This turning of the clamping members 15 and 16 may also be prevented, by having the bolt 23 pass through the holes 23' near the end of the pipe 17 and through the members themselves, as shown in Fig. 11.

The means for connecting the clamp to the other member to be held, such as the pipe 30, comprises a wedge member or ring 31 and a wedging connection between said ring and the members 15 and 16. This wedging connection comprises inwardly extending inclined or tapered wedge lugs 32 on each of the members for wedgingly engaging the pipe 30 and the oppositely disposed inclined or tapered annular surfaces 33 on the inner side of the ring 31. Resultantly when the ring 31 is placed in position upon the pipe 30 and the members 15 and 16 are positioned so as to dispose the lugs 32 between the pipe and the surface 33 of the ring 31, the tightening up of the members 15 and 16 about the pipe 17 will move the lugs 32 downwardly thus wedging them against the ring and the pipe to form a strong connection. The ends 34 of the members 15 and 16 are formed so as to conform to the contour of the pipe or other member to form a tight fit therewith to exclude dirt and they are beveled at 35 so that two, three or four sets of pipes may be coupled to a common pipe disposed at right angles thereto, as shown in Fig. 1, the inclined edges 35 of adjacent couplings abutting each other as shown. If desired the wedge lugs 32 may be made in one continuous wedge.

In some instances where it is desired to form a joint between only two angularly disposed pipes, the wedge member or ring 31 is made in the form shown in Figs. 7 to 9 inclusive. This member only differs from that shown in Figs. 1 to 6 inclusive in that it is provided with lugs 36 having annular inclined or tapered inner sides for wedging engagement with the wedge lugs 32 of the coupling members.

In some instances I may use a connection like that shown in Fig. 11 in which only one of the coupling members has a wedging engagement with the wedge member on the other pipe. In this instance the clamp member 16' is similar in all respects to the clamp member 16, but the wedge member 31' is provided with only one annular inclined or tapered portion 33' for receiving the lug or lugs 32 on the member 16'. This inclined portion 33' is formed on the lower end of the wedge member so as to provide a flat upper surface for the wedge member to prevent accumulation of dirt. The upper clamp 15' is the same as the member 15 except that the lugs are dispensed with and the reinforcing flanges 38 at the inner end of said member rest upon the flat upper surface 38' of said member.

In Fig. 13 I have shown a modification in which the wedge member consists of two parts, a heavy member 39 having inclined wedging surfaces 40 which are adapted to be engaged by the clamping members as in the first instance and a strap 41 having threaded ends 42 which pass through apertures in the ends of the member 39 and secure it to the post 30 by nuts 43 carried on the ends 42. It will be noted that more than one pipe 17 may be connected to the pipe 30 in this manner by using short clamping straps between the wedge members.

It will be noted that the bodies of the clamping members are so shaped to substantially conform to the contour of the parts to be held. By changing the contour of the contacting parts of the clamping members and the wedge member, the coupling device may be adapted to hold bars, rods or pipes, etc., of various shapes as well as in various relative positions to each other.

It will be further noted that the wedging connection above described securely locks the parts in position and prevents any lateral movement of the pipes with respect to each other. Furthermore, the wedge lugs 32 on the clamps form a reinforcing means for the members and thereby increase the strength of the coupling.

The invention thus exemplifies a simple, strong and sanitary coupling device which, owing to its wedging connection, securely fastens the parts to be clamped together.

I am aware that the details of construction herein shown and described may be changed and altered but such structures as come within the scope of the appended claims I deem to be within the spirit of my invention.

What I claim as my invention is:

1. A coupling device for connecting members extending at an angle to each other comprising a pair of mating clamping members having bodies adapted to substantially conform to the contour of the members to be connected together, one of said clamping members being provided with a wedge lug, means for securing said clamping members to one of the members to be connected, a wedging member mounted on and surrounding the other member to be connected and having wedging engagement with wedge lug of said clamping member and the member upon which it is mounted.

2. A coupling device for connecting together members extending at an angle to each other consisting of a wedge member surrounding one of the members to be connected, a pair of mating clamping members secured to the other member to be connected and provided with means for wedgingly engaging said wedge member and the member which it surrounds on the tightening up of the clamping members.

3. A coupling device for connecting together members extending at an angle to each other consisting of a member surrounding one of the members to be connected and provided with a wedge portion, a pair of mating members having bodies adapted to substantially conform to the contour of the members to be held, means for securing said clamping members to one of the members to be connected, and a wedge lug on one of said clamps for wedging engagement with said wedge portion and the other member.

4. A coupling device for connecting together members extending at an angle to each other comprising a wedge member surrounding one of the members to be connected, a pair of mating members having bodies adapted to substantially conform to the contour of the members to be held, an interlocking connection between the side edges of said mating members, means for securing said mating members to one of the members to be held, said mating members provided with parts forming a wedging connection between said mating members and said wedge member and the member which it surrounds.

5. A coupling device for connecting together members extending at an angle to each other comprising a pair of mating clamps having bodies adapted to substantially conform to the contour of the members to be held, inwardly extending reinforcing flanges formed at one end of said clamps, means for securing said clamps to one of the members to be connected, a wedge member mounted on the other member to be connected, said flanges having a wedging connection between said wedge member and the other member to be held.

6. In a coupling device, the combination of a pair of mating clamps having bodies adapted to substantially conform to the contour of the members to be held, means for securing said clamps to one of the members to be held, a wedge member surrounding the other member to be held and provided with inclined inner side portions, inwardly extending tapered lugs formed at one end of said clamps for wedging engagement between said inclined side portions of said wedge member and the member which it surrounds.

7. In a coupling device, the combination, with a pair of members to be held, one of said members being provided with a projection, of a pair of mating clamps, means for securing said clamps to the member provided with the projection, means on one of said clamps engaging with said projection to prevent a tendency of said clamps to turn or separate from said member, and means for wedgingly securing said clamps to the other member to be held.

8. A coupling device, for connecting together members extending at an angle to each other comprising a pair of clamping members surrounding one of the members to be held and partially embracing the other member to be held, means for clamping said clamping members to the member which they surround, and means for wedgingly securing and clamping said clamping members to the partially embraced member on the tightening up of the clamping members.

In testimony whereof, I affix my signature.

WILLIAM MITCHELL.

Copies of this patent may be obtained for five cents each, by addressing the "Commissioner of Patents, Washington, D. C."